United States Patent
Johnson et al.

(10) Patent No.: US 8,108,442 B2
(45) Date of Patent: Jan. 31, 2012

(54) SYSTEM FOR COMPRESSION AND STORAGE OF DATA

(75) Inventors: Carl Eric Johnson, Aubrey, TX (US); John M. Casey, Carrollton, TX (US); Joe Bob Cravy, McKinney, TX (US); Timothy Rondal Bruce, Carrollton, TX (US); William G. Abernathy, Lewisville, TX (US)

(73) Assignee: Computer Associates Think, Inc., Islandia, NY (US)

( * ) Notice: Subject to any disclaimer, the term of this patent is extended or adjusted under 35 U.S.C. 154(b) by 273 days.

(21) Appl. No.: 12/506,786

(22) Filed: Jul. 21, 2009

(65) Prior Publication Data
US 2010/0030797 A1      Feb. 4, 2010

Related U.S. Application Data

(60) Provisional application No. 61/082,747, filed on Jul. 22, 2008.

(51) Int. Cl.
*G06F 17/30*      (2006.01)
(52) U.S. Cl. ........................................... 707/802
(58) Field of Classification Search ............ 707/812, 707/802; 710/68; 709/247
See application file for complete search history.

(56) References Cited

U.S. PATENT DOCUMENTS

| | | | |
|---|---|---|---|
| 5,850,526 A * | 12/1998 | Chou | 709/247 |
| 5,909,250 A * | 6/1999 | Hardiman | 375/240.03 |
| 6,072,836 A * | 6/2000 | Hardiman | 375/240.03 |
| 6,215,907 B1 * | 4/2001 | Kumar et al. | 382/240 |
| 6,324,621 B2 * | 11/2001 | Singh et al. | 711/129 |
| 6,360,300 B1 * | 3/2002 | Corcoran et al. | 711/139 |
| 6,507,347 B1 * | 1/2003 | van de Ven | 345/619 |
| 7,319,667 B1 * | 1/2008 | Biederman | 370/231 |
| 7,451,290 B2 * | 11/2008 | Chandrasekaran et al. | 711/171 |
| 7,688,852 B2 * | 3/2010 | Bokish et al. | 370/468 |
| 7,895,242 B2 * | 2/2011 | Ergan et al. | 707/802 |
| 2004/0030847 A1 * | 2/2004 | Tremaine | 711/154 |
| 2004/0190488 A1 * | 9/2004 | Bokish et al. | 370/351 |
| 2004/0223611 A1 * | 11/2004 | Yan et al. | 380/37 |
| 2005/0071579 A1 * | 3/2005 | Luick | 711/154 |
| 2006/0077412 A1 * | 4/2006 | Phogat et al. | 358/1.13 |
| 2006/0212672 A1 * | 9/2006 | Chandrasekaran et al. | 711/171 |
| 2008/0307191 A1 * | 12/2008 | Lane et al. | 711/209 |
| 2009/0112949 A1 * | 4/2009 | Ergan et al. | 707/205 |
| 2009/0210943 A1 * | 8/2009 | Alon et al. | 726/24 |

* cited by examiner

*Primary Examiner* — Cam-Linh Nguyen
(74) *Attorney, Agent, or Firm* — Baker Botts L.L.P.

(57) ABSTRACT

According to one embodiment, a data storage system includes a storage medium coupled to a compression appliance. The compression appliance is operable to selectively compress data that is stored on the storage medium. The compression appliance selectively compresses the data according to a lower compression threshold and an upper compression threshold such that a useful compression level is achieved while balancing processor loading.

20 Claims, 2 Drawing Sheets

SYSTEM FOR COMPRESSION AND STORAGE OF DATA

RELATED APPLICATION

This application claims the benefit, under 35 U.S.C. §119 (e), of U.S. Provisional Patent Application No. 61/082,747 entitled System for Balanced Compression and Storage of Data, filed 22 Jul. 2008, which is incorporated herein by reference.

TECHNICAL FIELD

The present disclosure relates generally to computing systems and, more specifically, to data storage systems.

BACKGROUND

Computing systems may use various types of storage media for storing data. Computing systems, for example, may incorporate random access memory (RAM) or read only memory (ROM) for storage of readily accessible data. Storage of relatively larger volumes of data, however, may be more conducive to storage on magnetic or optical storage mediums, such as magnetic disk drives, tape drives, or optical disks.

SUMMARY

In particular embodiments, a method includes receiving an uncompressed data stream from a data source and additional steps depending on whether an extension unit is operating in active mode or passive mode. Additional steps for operating in active mode include compressing the uncompressed data stream into a compressed data stream; storing the compressed data stream in the storage medium; and periodically measuring a compression level of a last portion of the compressed data stream. In addition, if the compression level is less than a lower threshold, the extension unit switches to passive mode. Additional steps for operating in passive mode include storing the uncompressed data stream in a storage medium; periodically sampling a last portion of the uncompressed data stream; and measuring a compression potential of the sampled portion of the uncompressed data stream. In addition, if the compression potential is greater than the lower threshold, the extension unit switches to active mode, as discussed below.

Certain embodiments may provide one or more technical advantages. A technical advantage of one embodiment may be the ability to conserve processor resources by preventing unproductive uses of a compression appliance. Another technical advantage of one embodiment may be the ability to monitor compressibility of a data stream to determine whether it would be a productive use of processor resources to begin compressing data. A further technical advantage may be the ability to prevent over productive uses of a compression appliance.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present disclosure and its advantages, reference is made to the following description, taken in conjunction with the accompanying drawings, in which.

DETAILED DESCRIPTION OF EXAMPLE EMBODIMENTS

Figure 1:
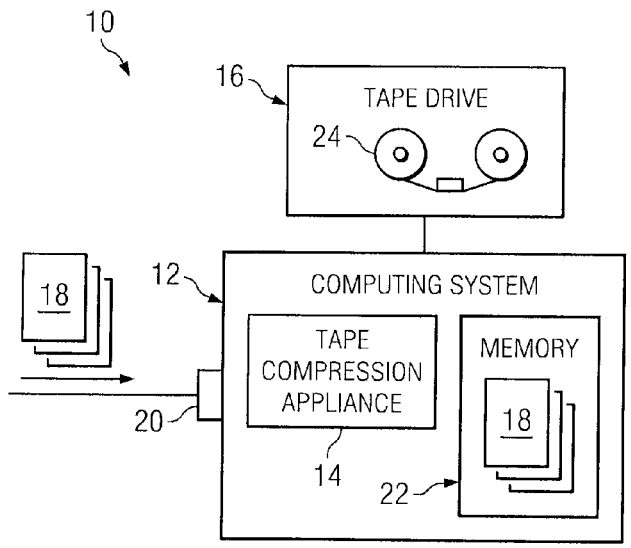
FIG. 1 illustrates an example computing system that includes an example compression appliance and an example storage medium.

FIG. 1 illustrates a data storage system, indicated generally at 10, for storing and selectively compressing data. As illustrated, data storage system 10 includes computing system 12, tape drive 16 for storing data 18 and compression appliance 14 for selectively compressing data 18. The components of system 10 interoperate to maintain performance of compression appliance 14 at a useful compression level and conserve processor resources. In particular embodiments, compression appliance 14 selectively compresses data 18 according to a lower compression threshold and an upper compression threshold to balance data compressibility against demand for processor resources. While not illustrated, system 10 may include any additional components to facilitate storing and selectively compressing data 18.

System 10, as illustrated, includes computing system 12, which receives data 18 from any suitable data source, such as a communication port 20 of computing system 12 or its internal memory 22. In operation, computing systems 12 may receive and transmit data 18 to any suitable device for storing data 18, which may be located either internally or externally to computing system 12.

As illustrated, system 10 includes tape drive 16, which represents any suitable device for storing data 18. In the illustrated embodiment, tape drive 16 stores data from computing system 12 on a magnetic tape medium 24. In particular embodiments, computing systems 12 may store data using any number and/or type of storage mediums, such as magnetic disks, optical disks, or other suitable storage mediums.

As illustrated, system 10 includes compression appliance 14, which represents any one of a variety of hardware and software components capable of selectively compressing data 18. For example, compression appliance 14 may include a set of instructions stored in memory 22 that are executable on one or more processors. In operation, compression appliance 14 receives data 18 from any suitable data source and selectively compresses data 18. In particular embodiments, compression appliance 14 may encrypt data 18 prior to storage in tape drive 16.

Selectively compressing data 18 may be advantageous where compression of an entire interval of data or of all data stored on tape drive 16 causes excessive demand or inefficient use of processor resources. One example of when this may occur is when compression appliance 14 compresses an entire data set that includes a portion of data that is relatively less compressible than other portions of the data set. Since some types of data are relatively less compressible than others, compression of data that is relatively less compressible may require relatively more processor resources, and thus encounter significant processor loading time without attaining a desired level of compression. As another example, compression of data at compression levels higher than desired or target compression levels may unjustifiably demand processor resources at a time when other applications may need to use processor resources. As these examples demonstrate, compressing an entire interval of data may consume processor resources that could be more efficiently utilized by other tasks on the same computing system.

In particular embodiments, system 10 may shut down compression appliance 14 when the operating costs outweigh the benefits of running the appliance due to compressibility of a sampled portion of data that is lower than a value set for lower threshold 34, which represents a non-productive or inefficient compression level threshold. In this way, system 10 ensures that compression appliance 14 achieves at least a productive compression level when in use. In particular embodiments, lower threshold 34 is based on a last (or most recently received) portion of a data stream and the compressibility of data included in that portion.

In particular embodiments, compression appliance 14 monitors the overall compression level of data stored on tape drive 16 and stores compressed data or uncompressed data to achieve an overall compression level in tape drive 16. In particular embodiments, the system may shut down the compression appliance 14 when the operation costs outweigh the benefits of running the appliance due to an overall compression level that is higher than a target overall compression level set by a user of system 10. However, in particular embodiments, system 10 may verify that processor resources are or may be otherwise in demand before shutting down the compression appliance. In particular embodiments, system 10 may test a data stream for compressibility while compression appliance 14 is not in use to determine whether it would be useful to turn the compression appliance on.

In one embodiment, compression appliance 14 periodically measures a compression level following receipt of a specified byte count of the data. That is, compression appliance 14 measures a compression level following receipt of each block of data having a specified byte count. In another embodiment, compression appliance 14 periodically measures a compression level at periodic pre-selected time intervals. In yet another embodiment, compression appliance 14 periodically measures a compression level following receipt of a specified quantity of files or folders comprising the received data. In these example embodiments, compression appliance 14 periodically may measure a compression level that represents an overall compression level or a compression level of a portion of a received data stream, such as a last or most recent portion of the received data stream that may be based on, for example, a data block size, an amount of time, etc.

Figure 2A:
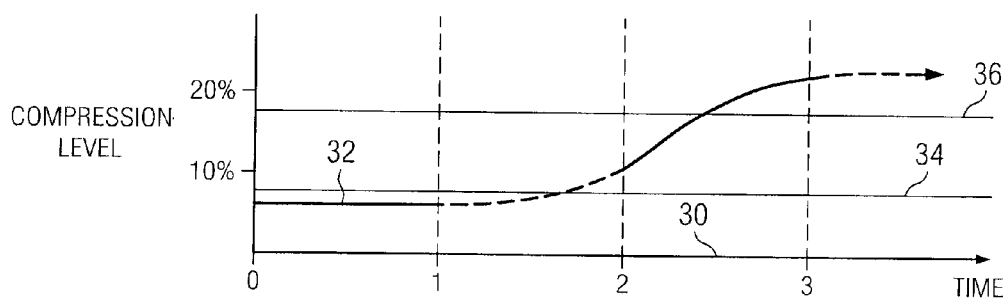
FIG. 2A illustrates a time chart that includes an overall compression level measured over time of data stored in the example storage medium from the system of FIG. 1.
Figure 2B:
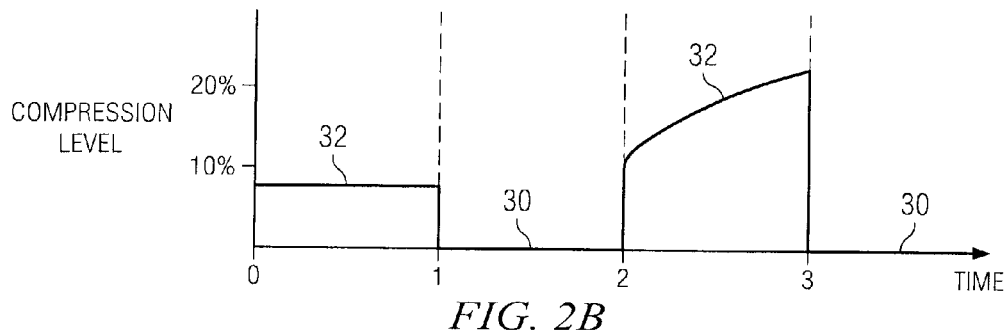
FIG. 2B illustrates a time chart that corresponds in time to the time chart of FIG. 2A and includes individual compression levels of portions of an uncompressed data stream and a compressed data stream that may be stored in the example storage medium.

As a specific example of selectively compressing and storing data 18 in tape drive 16 using compression appliance 14 from system 10, consider FIGS. 2A and 2B. The components and operation of compression appliance 14 are discussed in greater detail with respect to FIGS. 2A, 2B, and 3.

A component described in FIG. 1 may include an interface, logic, memory, and/or other suitable element. An interface represents hardware and/or appropriate controlling software. An interface receives input, sends output, processes the input and/or output, and/or performs other suitable operations.

Logic represents software and/or programmed logic devices capable of execution when loaded onto processing devices. Processing devices include one or more computers, one or more microprocessors, one or more applications, and/or or other logic. When executed, logic performs the operations of a component or manages the operations of a component, such as, for example, generating output from input. A computer-readable medium encoding logic performs and/or manages operations when loaded onto processing devices and executed.

A memory stores information. A memory may comprise one or more tangible, computer-readable, and/or computer-executable storage media. Examples of a memory include computer memory (for example, Random Access Memory (RAM) or Read Only Memory (ROM)), mass storage media (for example, a hard disk), removable storage media (for example, a Compact Disk (CD) or a Digital Video Disk (DVD)), network storage (for example, a server), and/or other computer-readable medium.

The above description provides an example of a system for storing and selectively compressing data 18. The example explains particular embodiments and is not all-inclusive. Although system 100 depicts a particular logical configuration of components, system 100 may include any appropriate logical and physical combination, separation, or distribution of the components and their functionality. In addition, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program. As used in this document, "each" refers to every individual member of a set or every individual member of a subset of a set.

FIGS. 2A and 2B illustrate time charts that include compression levels of data stored in tape drive 16 that may be achieved over time by selectively compressing portions of an uncompressed data stream 30. FIGS. 2A and 2B provide a specific example according to particular embodiments of compression appliance 14 performing selective compression to achieve useful compression levels while conserving processor resources. In some embodiments of system 10, such as those described with respect to FIGS. 2A and 2B, compression appliance 14 selectively compresses data according to lower threshold 34 and upper threshold 36. In other embodiments, compression appliance 14 may selectively compress data according to only one of lower threshold 34 or upper threshold 36.

As illustrated, FIG. 2A is a time chart that includes an overall compression level of data stored in tape drive 16 that may be achieved by storing portions of an uncompressed data stream 30 and a compressed data stream 32 from $time_0$ to $time_3$. FIG. 2A also includes a lower threshold 34 and an upper threshold 36. As illustrated, the solid line portion of compressed data stream 32 indicates that compression appliance 14 is actively compressing uncompressed data stream 30, and the dashed line portion of uncompressed data stream 30 indicates that compression appliance 14 is not actively compressing uncompressed data stream 30. In this particular time chart, the overall compression level of data stored in tape drive 16 has been normalized according to the value (which in this case is 0) of the overall compression level of data stored in tape drive 16 that may be achieved by compression appliance 14 no matter how incompressible a given data set may be.

In particular embodiments, an overall compression level is measured based on data stored in tape drive 16 from a starting point of compression of an interval of data received from a data source (for example, $time_0$) to an ending point of the interval, at which point the overall compression level is reset. As used herein, an "interval of data" may refer to a particular data file, group of data files, amount of data, amount of time for receiving data, or any other interval that may be associated with receiving data from a data source by compression appliance 14.

In particular embodiments, lower threshold 34 represents a user- or system-determined compression level of a portion of uncompressed data stream 32 (that may be achieved, for example, by compressing that portion using compression appliance 14) indicating that the data is sufficiently compressible to justify the operating costs of running compression appliance 14. Below lower threshold 34, the operating costs of computing system 12 running compression appliance 14 outweigh the benefits of the actual compression level that may be achieved for the portion of data, resulting in undue processor loading by compression appliance 14. In other words, it would not be a productive use of processor resources to compress data that is not at least compressible enough to be compressed at the compression level of lower threshold 34.

In particular embodiments, upper threshold 36 represents a user- or system-determined overall compression level that is desired for data stored in tape drive 16. Upper threshold 36 may be specific to a particular type of data, a particular interval of data, one or more particular sets or files of data, or some or all data stored in a particular storage medium or type of storage medium that may be used by a particular computing system or by a particular compression appliance 14. Above upper threshold 34, compression appliance 14 is over productive, indicating that further data compression is unnecessary and may not, under certain circumstances, justify the operating costs of running compression appliance 14.

As illustrated, FIG. 2B is a time chart that corresponds in time to the time chart of FIG. 2A and includes individual compression levels of portions of uncompressed data stream 30 and compressed data stream 32 that may be stored in tape drive 16. Note that any sampled portion of uncompressed data stream 30 comprises a potential compression level that may be attained due to compression of that portion of uncompressed data stream 30 using compression appliance 14.

At $time_0$, compression appliance 14 begins storing compressed data stream 32 in tape drive 16. The compression level of the portion of compressed data stream 32 from $time_0$ to $time_1$, which is equivalent to the overall compression level of data stored in tape drive 16 as of $time_1$, however, is less than lower threshold 34. Thus at $time_1$, compression appliance 14 begins storing uncompressed data stream 30 in tape drive 16. At this time, compression appliance 14 alleviates computing system 12 of undue processor loading due to compression of a portion of data that is not sufficiently compressible to yield a compression level specified by lower threshold 34.

At $time_2$, compression appliance 14 measures the potential compression level of a sample of uncompressed data stream 30 using any sampling and measuring techniques. Because the compression level of compressed data stream 32 is greater than lower threshold 34 and less than upper threshold 36, compression appliance 14 may switch to active mode, actively compressing uncompressed data stream 30 into compressed data stream 32 and storing compressed data stream 32 in tape drive 16. In particular embodiments, compression appliance 14 periodically samples uncompressed data stream 30 to determine a potential compression level that may be achieved. Once the compression level rises above lower threshold 34, compression of uncompressed data stream 32 commences.

At $time_3$, compression appliance 14 measures the overall compression level of data stored in tape drive 16 and determines that it exceeds upper threshold 36. Compression appliance 14 may switch to passive mode to begin storing uncompressed data stream 30 in tape drive 16. In particular embodiments, after $time_3$, while in passive mode, compression appliance 14 periodically measures the overall compression level of data stored in tape drive 16. For example, compression appliance 14 may measure the overall compression level of data stored in tape drive 16 following receipt of each block of uncompressed data stream 30. In this example, each block of uncompressed data stream 30 represents a portion of uncompressed data stream 30 having a particular size, such as a 1 Kilo-Byte, a 25 Kilo-Byte, or a 256 Kilo-Byte block size.

According to particular embodiments, compression appliance 14 may continue to perform compression even though an overall compression level measures above upper threshold 36. For example, if processor resources are not otherwise in demand, being used or expected to be in demand or used, for example, by other applications or hardware attached to computing system 12, it may be an inefficient use of processor resources to continue compressing data even though further compression is unnecessary. In some embodiments, compression appliance may measure a current consumption level of processor resources based on the processor resources currently in use or in demand, and compression appliance 14 may decide whether to continue compression based on the current consumption level. In other embodiments, compression appliance 14 may determine whether to continue compression based on a time of day. For example, compression appliance 14 may only continue compressing data beyond an upper threshold 36 between midnight and 6:00 a.m.

The previously described process may continue throughout execution of compression appliance 14. Over time, in particular embodiments, the combined portions of compressed data stream 32 and uncompressed data stream 30 stored in tape drive 16 may approximately achieve a user-specified target compression level in tape drive 16, such that compression appliance 14 provides sufficient overall compression while alleviating undue processor loading of computing system 12. In one embodiment, lower threshold 34 and upper threshold 36 may be independently adjustable to tailor the target compression level achieved by compression appliance 14. In another embodiment, compression appliance 14 may determine the type of files comprising uncompressed data stream 30 and automatically adjust lower threshold 34 and upper threshold 36 according to the type of files to be compressed.

According to particular embodiments, compression appliance 14 may store compression levels over time that are achieved for a given dataset, such that compression appliance 14 may determine whether to compress a later iteration of the same dataset at certain times depending on whether compression appliance 14 previously compressed the same portions of data at the same times for the same dataset. For example, if compression appliance 14 recognizes that a particular data set includes relatively less compressible data for the first 25 Kilo-Bytes of data received followed by relatively more compressible data, then compression appliance 14 may compress the data accordingly while conserving processor resources that would otherwise be used to sample and measure compression levels. As another example, compression appliance may recognize that a given data set includes an index within the first 25 Kilo-Bytes of data, which is typically a less compressible type of data, followed by more compressible data. In particular embodiments, compression appliance 14 may recognize a later generation of a previously received data set by storing a data set name along with its selective compression pattern.

Figure 3:
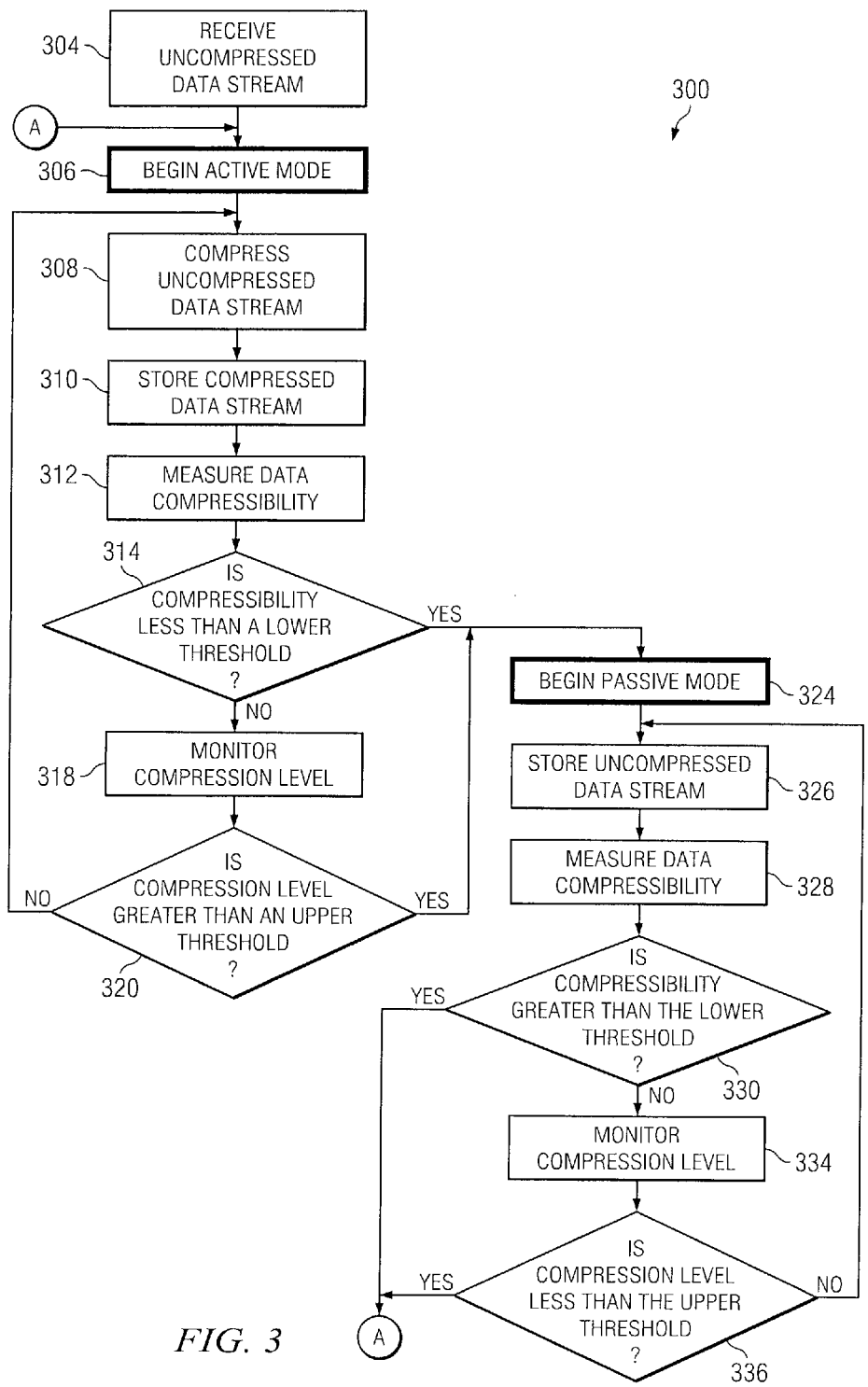
FIG. 3 is a flowchart illustrating a method for selectively compressing data from the system.

FIG. 3 is a flowchart illustrating a method, indicated generally at 300, for selectively compressing data 18 in accordance with various embodiments of the present disclosure. As illustrated, method 300 shows the steps involved for compression appliance 14 to receive data 18, selectively compress various portions of data 18, and store portions of uncompressed data stream 30 and portions of compressed data stream 32 in tape drive 16.

As illustrated, at step 304, compression appliance 14 receives uncompressed data stream 30, and at step 306, begins operating in active mode. In active mode, compression appliance 14, at step 308, compresses uncompressed data stream 30; at step 310, stores compressed data stream 32; and at step 312, measures data compressibility. At step 314, compression appliance 14 determines, whether the measurement for data compressibility is less than lower threshold 34. If data compressibility is less than lower threshold 34, compression appliance 14 switches to passive mode. Optionally, while in active mode, compression appliance 14 monitors compression level at step 318. At step 320, compression appliance 14 determines whether the compression level measurement is greater than upper threshold 36. If the compression level measurement is greater than upper threshold 36, compression appliance 14 switches to passive mode.

As illustrated, method 300 also includes the steps for compression appliance 14 to operate passively. In passive mode, compression appliance 14, at step 326, stores uncompressed data stream 30, and, at step 328, measures data compressibility. At step 330, compression appliance 14 determines whether data compressibility is greater than lower threshold 34. If data compressibility is greater than lower threshold 34, compression appliance 14 switches to active mode. Optionally, while in passive mode, compression appliance 14 monitors compression level at step 334. At step 336, compression appliance 14 determines whether the compression level is less than upper threshold 36. If the compression level is less than upper threshold 36, compression appliance 14 switches to active mode.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as fall within the scope of the appended claims.

What is claimed is:

1. A data storage system comprising:
a compression appliance coupled to a storage medium, the compression appliance operable to receive an uncompressed data stream from a data source and to:
in an active mode:
compress the uncompressed data stream into a compressed data stream;
store the compressed data stream in the storage medium;
periodically measure a compression level of a last portion of the compressed data stream, the compression level indicating an amount of change between the uncompressed data stream and the compressed data stream; and
if the compression level is less than a lower threshold, switch to a passive mode; and
in the passive mode:
store the uncompressed data stream in a storage medium;
periodically sample a last portion of the uncompressed data stream;
measure a compression potential of the sampled portion of the uncompressed data stream; and
if the compression potential is greater than the lower threshold, switch to the active mode.

2. The data storage system of claim 1, wherein the compression appliance is further operable to:
in the active mode:
periodically monitor an overall compression level of the storage medium; and
if the overall compression level is greater than an upper threshold, switch to the passive mode.

3. The data storage system of claim 1, wherein the compression appliance is further operable to:
in the passive mode:
periodically monitor an overall compression level of the storage medium; and
if the overall compression level is less than the upper threshold, switch to the active mode.

4. The data storage system of claim 1, wherein the compression appliance is operable to periodically monitor the overall compression level by measuring the overall compression level following a specified one of:
receipt of a specified byte count of the uncompressed data stream;
a specified quantity of files; and
a specified amount of time.

5. The data storage system of claim 1, wherein the compression appliance is operable to encrypt data prior to storing the data in the storage medium.

6. The data storage system of claim 3, the compression appliance is further operable in the passive mode, if the overall compression level is higher than the upper threshold, to:
measure a current consumption level of processor resources; and
if the current consumption level is greater than a low consumption level setting, switch to the active mode.

7. The data storage system of claim 3, the compression appliance is further operable in the passive mode, if the overall compression level is higher than the upper threshold, to:
determine a time of day; and
if the time of day is during a low-load time setting stored by the compression appliance, switch to the active mode.

8. The data storage system of claim 1, wherein the compression appliance is further operable to:
store a selective compression pattern used by the compression appliance for a first iteration of a data set;
receive a second iteration of the data set; and
apply the selective compression pattern to the second iteration of the data set.

9. A method comprising:
receiving an uncompressed data stream from a data source; and
in an active mode:
compressing the uncompressed data stream into a compressed data stream;
storing the compressed data stream in the storage medium;
periodically measuring a compression level of a last portion of the compressed data stream, the compression level indicating an amount of change between the uncompressed data stream and the compressed data stream; and
if the compression level is less than a lower threshold, switching to a passive mode; and
in the passive mode:
storing the uncompressed data stream in a storage medium;
periodically sampling a last portion of the uncompressed data stream;

measuring a compression potential of the sampled portion of the uncompressed data stream; and if the compression potential is greater than the lower threshold, switching to the active mode.

10. The method of claim 9, further comprising:
in the active mode:
periodically monitoring an overall compression level of the storage medium; and
if the overall compression level is greater than an upper threshold, switching to the passive mode.

11. The method of claim 9, further comprising:
in the passive mode:
periodically monitor an overall compression level of the storage medium; and
if the overall compression level is less than the upper threshold, switch to the active mode.

12. The method of claim 9, further comprising periodically monitoring the overall compression level by measuring the overall compression level following a specified one of:
receipt of a specified byte count of the uncompressed data stream;
a specified quantity of files; and
a specified amount of time.

13. The method of claim 9, further comprising encrypting data prior to storing the data in the storage medium.

14. The method of claim 9, further comprising, in the passive mode, if the overall compression level is higher than the upper threshold:
measuring a current consumption level of processor resources; and
if the current consumption level is greater than a low consumption level setting, switching to the active mode.

15. The method of claim 9, further comprising, in the passive mode, if the overall compression level is higher than the upper threshold:
determining a time of day; and
if the time of day is during a low-load time setting stored by the compression appliance, switching to the active mode.

16. The method of claim 9, further comprising:
storing a selective compression pattern used by the compression appliance for a first iteration of a data set;
receiving a second iteration of the data set; and
applying the selective compression pattern to the second iteration of the data set.

17. A computer readable storage medium comprising logic, the logic operable when executed by a processor to:

receive an uncompressed data stream from a data source; and
in an active mode:
compress the uncompressed data stream into a compressed data stream;
store the compressed data stream in the storage medium;
periodically measure a compression level of a last portion of the compressed data stream, the compression level indicating an amount of change between the uncompressed data stream and the compressed data stream; and
if the compression level is less than a lower threshold, switch to a passive mode; and
in the passive mode:
store the uncompressed data stream in a storage medium;
periodically sample a last portion of the uncompressed data stream;
measure a compression potential of the sampled portion of the uncompressed data stream; and
if the compression potential is greater than the lower threshold, switch to the active mode.

18. The computer readable storage medium of claim 17, the logic further operable when executed to:
in the active mode:
periodically monitoring an overall compression level of the storage medium; and
if the overall compression level is greater than an upper threshold, switching to the passive mode.

19. The computer readable storage medium of claim 17, the logic further operable when executed to:
in the passive mode:
periodically monitor an overall compression level of the storage medium; and
if the overall compression level is less than the upper threshold, switch to the active mode.

20. The computer readable storage medium of claim 17, the logic further operable when executed to:
periodically monitor the overall compression level by measuring the overall compression level following a specified one of:
receipt of a specified byte count of the first data stream;
a specified quantity of files; and
a specified amount of time.

* * * * *